US010559786B2

(12) United States Patent
Marasco et al.

(10) Patent No.: US 10,559,786 B2
(45) Date of Patent: Feb. 11, 2020

(54) CELL PACKAGING TECHNIQUES

(71) Applicant: Apple Inc., Cupertino, CA (US)

(72) Inventors: Angelo V. Marasco, Cupertino, CA (US); Nathan J. Bohney, Campbell, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/795,877

(22) Filed: Oct. 27, 2017

(65) Prior Publication Data

US 2019/0074488 A1 Mar. 7, 2019

Related U.S. Application Data

(60) Provisional application No. 62/555,464, filed on Sep. 7, 2017.

(51) Int. Cl.
| | |
|---|---|
| *H01M 2/08* | (2006.01) |
| *H01M 10/42* | (2006.01) |
| *H01M 2/26* | (2006.01) |
| *H01M 2/14* | (2006.01) |

(52) U.S. Cl.
CPC .............. *H01M 2/08* (2013.01); *H01M 2/14* (2013.01); *H01M 2/26* (2013.01); *H01M 10/425* (2013.01); *H01M 2010/4271* (2013.01); *H01M 2220/30* (2013.01)

(58) Field of Classification Search
CPC .............. H01M 10/425; H01M 10/46; H01M 2010/4271; H01M 2220/30; H01M 2/08; H01M 2/1066; H01M 2/204; H01M 2/26; H01M 2/04
See application file for complete search history.

(56) References Cited

U.S. PATENT DOCUMENTS

| | | | | |
|---|---|---|---|---|
| 6,524,732 B1* | 2/2003 | Iwaizono | .............. | H01M 10/42 |
| | | | | 429/100 |
| 2009/0191448 A1* | 7/2009 | Yamamoto | .............. | B29C 70/72 |
| | | | | 429/94 |
| 2011/0123836 A1* | 5/2011 | Jang | ........................ | H01M 2/34 |
| | | | | 429/7 |

FOREIGN PATENT DOCUMENTS

| | | |
|---|---|---|
| EP | 2328210 A1 | 6/2011 |
| EP | 2760064 A2 | 7/2014 |
| KR | 20140131715 A | 11/2014 |

OTHER PUBLICATIONS

International Search Report and Written Opinion dated Mar. 19, 2018 in PCT/US2018/015064, 14A pages.

* cited by examiner

*Primary Examiner* — Adam A Arciero
(74) *Attorney, Agent, or Firm* — Kilpatrick Townsend & Stockton LLP

(57) ABSTRACT

Battery systems according to embodiments of the present technology may include a battery cell having an electrode tab extending from an edge of the battery cell. The systems may also include a module electrically coupled with the battery cell. The module may be characterized by a first surface, a height, and a second surface opposite the first surface. A conductive tab coupled along the first surface of the module may extend from a first end parallel to a plane of the first surface. The conductive tab may be characterized by a curvature proximate a midpoint of the conductive tab. A distal region of the conductive tab may return back across the first surface of the module substantially parallel to the first surface. A distal portion of the electrode tab may be fixedly coupled with the distal region of the conductive tab.

21 Claims, 3 Drawing Sheets

CELL PACKAGING TECHNIQUES

CROSS REFERENCE TO RELATED APPLICATION

The application claims the benefit of U.S. Application Ser. No. 62/555,464 filed Sep. 7, 2017, the entire disclosure of which is hereby incorporated by reference for all purposes.

TECHNICAL FIELD

The present technology relates to battery systems. More specifically, the present technology relates to battery component coupling to produce more robust designs

BACKGROUND

Batteries are used in many devices. Portable devices may present more opportunity for water or environmental materials to come in contact with battery components, which may cause malfunction or failure.

SUMMARY

Battery systems according to embodiments of the present technology may include a battery cell having an electrode tab extending from an edge of the battery cell. The systems may also include a module electrically coupled with the battery cell. The module may be characterized by a first surface, a height, and a second surface opposite the first surface. A conductive tab coupled along the first surface of the module may extend from a first end parallel to a plane of the first surface. The conductive tab may be characterized by a curvature proximate a midpoint of the conductive tab. A distal region of the conductive tab may return back across the first surface of the module substantially parallel to the first surface. A distal portion of the electrode tab may be fixedly coupled with the distal region of the conductive tab.

In some embodiments, the module includes a circuit board having components extending from a surface of the circuit board. The module may also include a spacer extending from the second surface of the module to the first surface of the module. The spacer may define a cavity into which the components extending from the surface of the circuit board may be positioned. The spacer may include an adhesive coupling the spacer with the circuit board. The spacer may be characterized by an increased thickness on opposite sides of the spacer extending from the second surface to the first surface. The module may also include a pottant within the cavity and encapsulating the components extending from the surface of the circuit board. The module may include a first water resistant tape extending about the module and across the first end of the conductive tab. The system may also include a second water resistant tape extending across the distal portion of the electrode tab and contacting the first water resistant tape at the first surface of the module. The second water resistant tape may extend about an interior side of the module and along the second surface of the module.

The present technology also encompasses additional battery systems. The systems may include a battery cell having an electrode tab extending from an edge of the battery cell. The systems may include a bracket extending laterally from the battery cell and supporting the electrode tab. The systems may include a module seated above a second surface of the electrode tab opposite a first surface of the electrode tab. The module may include a conductive tab electrically coupled with the electrode tab. The systems may also include an environmental tape substantially encompassing the module and extending towards the battery cell and contacting at least a portion of the bracket. The systems may include a seating tape positioned between the module and the second surface of the electrode tab. The environmental tape may contact the seating tape along a surface of the seating tape. The module may include a circuit board characterized by a first surface adjacent the conductive tab and a second surface opposite the first. The circuit board may include electrical components extending from the second surface. The module may also include a spacer extending from a second surface of the module to a first surface of the module opposite the second surface of the module. The spacer may define a cavity into which the components extending from the second surface of the circuit board are positioned.

The present technology also encompasses multi-cell batteries. The systems may include a first battery cell having a first electrode tab extending from a first end of the first battery cell. The systems may include a second battery cell positioned adjacent the first end of the first battery cell. The second battery cell may extend perpendicular to the first battery cell, and the second battery cell may include a second electrode tab extending from a first end of the second battery cell. The systems may include a power module comprising a flexible circuit material including a first portion extending in a first direction along the first battery cell. The power module may include a second portion extending in a second direction substantially normal to the first direction along the second battery cell. The power module may include a first circuit module extending parallel to the first end of the first battery cell and electrically coupled with the first electrode tab. The power module may also include a second circuit module extending parallel to the first end of the second battery cell and electrically coupled with the second electrode tab.

In some embodiments, the first circuit module may extend normal to the first portion of the power module. The second circuit module may extend normal to the second portion of the power module. The power module may include a power tab extending from a first side of the power module opposite a second side of the power module from which the first circuit module and the second circuit module extend. The flexible circuit material may include a first rigid section including the first portion of the power module, and may include a second rigid section including the second portion of the power module. The flexible circuit material may include a flexible joint coupling the first rigid section and the second rigid section. The systems may also include a bracket in which the first battery cell and the second battery cell are seated. The bracket may include a first section extending along a portion of the first electrode tab, and may include a second section extending along a portion of the second electrode tab. The bracket may include a sidewall extending between the first battery cell and the first portion of the power module.

Such technology may provide numerous benefits over conventional technology. For example, the present systems may limit water ingress to the battery cell structure. Additionally, the present systems may increase the battery cell and module protection against environmental contaminants. These and other embodiments, along with many of their advantages and features, are described in more detail in conjunction with the below description and attached figures.

BRIEF DESCRIPTION OF THE DRAWINGS

A further understanding of the nature and advantages of the disclosed embodiments may be realized by reference to the remaining portions of the specification and the drawings.

Several of the figures are included as schematics. It is to be understood that the figures are for illustrative purposes, and are not to be considered of scale unless specifically stated to be of scale. Additionally, as schematics, the figures are provided to aid comprehension and may not include all aspects or information compared to realistic representations, and may include exaggerated material for illustrative purposes.

In the figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION

Batteries, battery cells, and more generally energy storage devices, are used in a host of different systems. Many portable devices may be exposed to water, dust, or other environmental contaminants from being dropped, opened, submerged, or otherwise exposed to everyday environments. Conventional technologies attempt to improve device seals, or packaging of the battery itself. However, terminals of the battery often remain exposed, which can lead to corrosion or a point of ingress for water or contaminants over time. The present technology overcomes these issues with novel packaging that more securely covers terminals and cell access locations. Additionally, the present technology provides new power module designs for coupling multiple battery cells within a reduced space. After illustrating an exemplary cell that may be used in embodiments of the present technology, the present disclosure includes power module designs and battery system designs for use in a variety of devices in which battery cells may be used.

Although the remaining portions of the description will routinely reference lithium-ion batteries, it will be readily understood by the skilled artisan that the technology is not so limited. The present techniques may be employed with any number of battery or energy storage devices, including other rechargeable and primary battery types, as well as electrochemical capacitors. Moreover, the present technology may be applicable to batteries and energy storage devices used in any number of technologies that may include, without limitation, phones and mobile devices, handheld electronic devices, laptops and other computers, as well as other devices that may benefit from the use of rechargeable battery technology.

Figure 1:
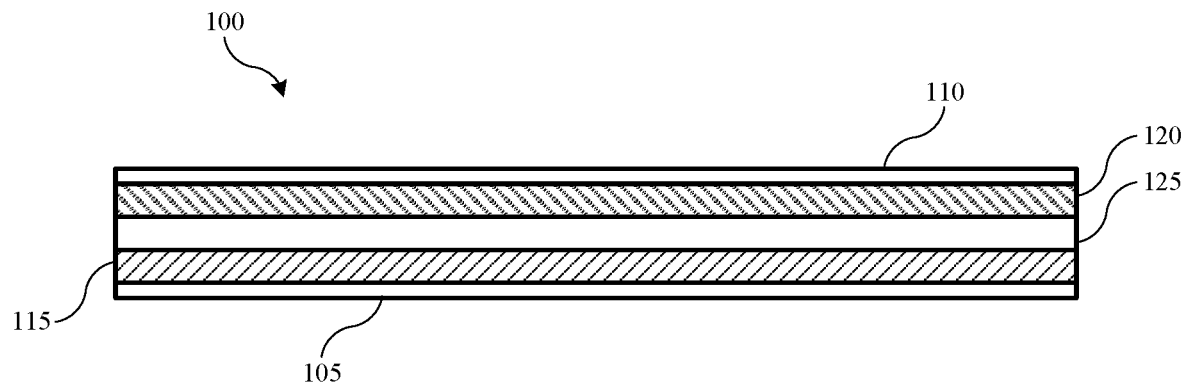
FIG. 1 shows a schematic cross-sectional view of a battery cell according to some embodiments of the present technology.

FIG. 1 depicts a schematic cross-sectional view of an energy storage device 100 according to embodiments of the present technology. Energy storage device 100 may be or include a battery cell, and may include a number of cells coupled together to form a battery structure. As would be readily understood, the layers are not shown at any particular scale, and are intended merely to show the possible layers of cell material of one or more cells that may be incorporated into the energy storage device 100. In some embodiments, as shown in FIG. 1, battery cell 100 includes a first current collector 105 and a second current collector 110. In embodiments one or both of the current collectors may include a metal or a non-metal material, such as a polymer or composite. The first current collector 105 and second current collector 110 may be different materials in embodiments. For example, in some embodiments the first current collector 105 may be a material selected based on the potential of an anode active material 115, such as copper, stainless steel, or any other suitable metal, as well as a non-metal material including a polymer. The second current collector 110 may be a material selected based on the potential of a cathode active material 120, such as aluminum, stainless steel, or other suitable metals, as well as a non-metal material including a polymer. In other words, the materials for the first and second current collectors can be selected based on electrochemical compatibility with the anode and cathode active materials used.

The first and second current collectors may be made of any material known in the art. For example, copper, aluminum, nickel, or stainless steel may be used, as well as composite materials having metallic aspects, and non-metallic materials including polymers. In some instances the metals or non-metals used in the first and second current collector may be the same or different. The materials selected for the anode and cathode active materials may be any suitable battery materials. For example, the anode active material 115 may be silicon, graphite, carbon, a tin alloy, lithium metal, a lithium-containing material, such as lithium titanium oxide (LTO), or other suitable materials that can form an anode in a battery cell. Additionally, for example, the cathode active material 120 may be a lithium-containing material. In some embodiments, the lithium-containing material may be a lithium metal oxide, such as lithium cobalt oxide, lithium manganese oxide, lithium nickel manganese cobalt oxide, lithium nickel cobalt aluminum oxide, or lithium titanate, while in other embodiments the lithium-containing material can be a lithium iron phosphate, or other suitable materials that can form a cathode in a battery cell.

The first and second current collectors as well as the active materials may have any suitable thickness. A separator 125 may be disposed between the electrodes, and may be a polymer film or a material that may allow lithium ions to pass through its structure while not otherwise conducting electricity. Active materials 115 and 120 may additionally include an amount of electrolyte in a completed cell configuration. The electrolyte may be a liquid including one or more salt compounds that have been dissolved in one or more solvents. The salt compounds may include lithium-containing salt compounds in embodiments, and may include one or more lithium salts including, for example, lithium compounds incorporating one or more halogen elements such as fluorine or chlorine, as well as other non-metal elements such as phosphorus, and semimetal elements including boron, for example.

In some embodiments, the salts may include any lithium-containing material that may be soluble in organic solvents. The solvents included with the lithium-containing salt may be organic solvents, and may include one or more carbonates. For example, the solvents may include one or more carbonates including propylene carbonate, ethylene carbonate, ethyl methyl carbonate, dimethyl carbonate, diethyl carbonate, and fluoroethylene carbonate. Combinations of solvents may be included, and may include for example, propylene carbonate and ethyl methyl carbonate as an exemplary combination. Any other solvent may be included that may enable dissolving the lithium-containing salt or salts as well as other electrolyte component, for example, or may provide useful ionic conductivities, such as greater than or about 5-10 mS/cm.

Although illustrated as single layers of electrode material, cell material 100 may be any number of layers. Although the cell may be composed of one layer each of anode and cathode material as sheets, the layers may also be formed into a jelly roll design, or folded design, prismatic design, or any form such that any number of layers may be included in cell material 100. For embodiments which include multiple layers, tab portions of each anode current collector may be coupled together, as may be tab portions of each cathode current collector. Once the cell has been formed, a pouch or enclosure may be formed about the cell to contain electrolyte and other materials within the cell structure. Terminals may extend from the pouch to allow electrical coupling of the cell for use in devices. The coupling may be directly to a load that may utilize the power, and in some embodiments the battery cell may be coupled with a control module that may monitor and control charging and discharging of the battery cell.

Figure 2:
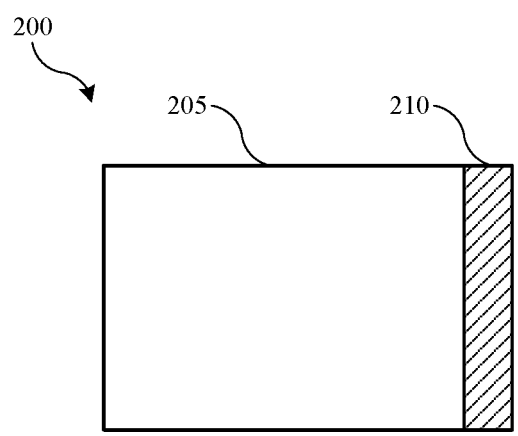
FIG. 2 shows a schematic plan view of a battery system according to some embodiments of the present technology.

FIG. 2 shows a schematic plan view of a battery system 200 according to some embodiments of the present technology. As illustrated, battery system 200 may include a battery cell 205, as well as a battery module 210. Battery module 210 may be electrically connected to battery 205 to provide a variety of functionality. For example, battery module 210 may monitor battery cell 205 during charging and discharging operations, and may ensure the battery cell is not overcharged or over depleted during use. Additionally, battery module 210 may monitor overall health of the battery cell 205 to ensure proper functioning. Battery module 210 may couple with terminals of the battery, such as one or both of the positive and negative terminals, in order to provide this functionality.

Battery module 210 may also provide access to an additional electrical connector that may allow device components to access the battery storage through the battery module 210. In this way, battery module 210 may provide a pass-through functionality for delivering power from battery cell 205. Consequently, battery module 210 may be under constant load from the battery cell, and may provide multiple locations for contaminants that may affect functionality, or for water ingress to electrically conductive portions of the battery. Should water permeate into the battery cell 205, the battery system 200 may malfunction or fail.

Battery cell 205 may include a battery cell, which may be similar to battery cell 100 described above, and may include a pouch or enclosure to protect the battery cell from exposure to the environment. The pouch may also operate to maintain electrolyte and other materials within the battery cell. To access the battery cell through this pouch, one or more terminals or leads may extend through the pouch. Although a variety of sealing materials or techniques may be used to secure this access, should the terminal corrode over time, it may eventually provide a path into the battery cell for water, which may cause the cell to fail. When battery cell 205 is included in a device, such as a mobile phone, for example, if the device is dropped in liquid, the liquid may enter the device housing. Once within the housing, the liquid may be in contact with the battery cell or terminals if not protected. Additionally, as the battery cycles, heat is generated that may produce vapor within the device housing from the liquid. Water vapor contained within the device may also corrode conductive terminals, or may seep through insufficiently secured terminal penetrations. Additionally, dust or environmental particulates may accumulate across aspects of the battery system, which may produce potential short circuit paths. The present technology may include materials and designs to reduce or limit contaminant and water access to the terminals as will be described further below.

Figure 3:
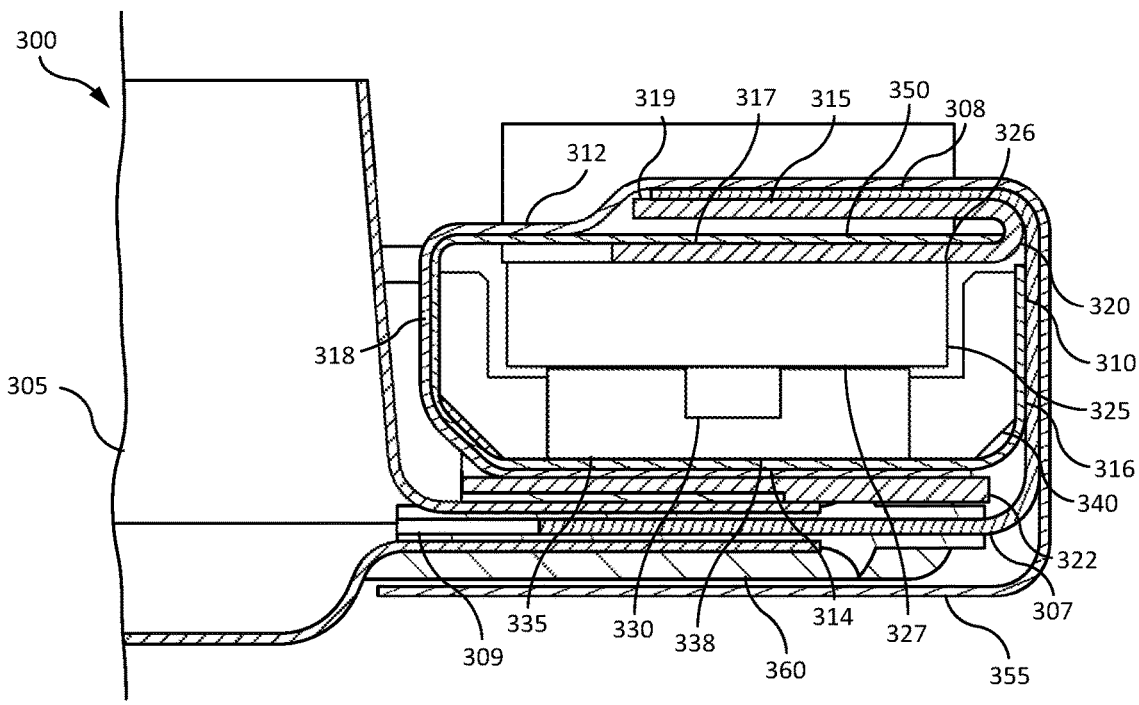
FIG. 3 shows a schematic cross-sectional view of a battery system according to embodiments of the present technology.

FIG. 3 shows a schematic cross-sectional view of a battery system 300 according to embodiments of the present technology. Battery system 300 may include any of the components previously described, and may include a battery cell 305, and a module 310. Battery cell 305 may include a battery cell as previously described in FIG. 1, and may include one or more cells included within a pouch or packaging. Module 310 may monitor and manage aspects of battery cell 305 operation, and may be a power control module in embodiments.

Battery cell 305 may include one or more terminals or electrode tabs 307 extending from battery cell 305 for providing electrical access to the battery cell. A sealant 309 may be formed or disposed about electrode tab 307 where it penetrates battery cell 305. Electrode tab 307 may extend from an edge or side of battery cell 305. Module 310 may be electrically coupled with battery cell 305 through electrode tab 307. The module 310 may be characterized by a first surface 312 and a second surface 314 opposite the first surface. Module 310 may also be characterized by a height between the first surface 312 and the second surface 314. Coupled along first surface 312 may be a conductive tab 315. Conductive tab 315 may be electrically coupled with electrode tab 307 to access and monitor battery cell 305.

Battery system 300 may provide a number of access locations for water ingress into the battery cell 305 of the system, which may cause corrosion or damage to one or more components if not adequately protected. For example, in addition to where electrode tab 307 extends through the enclosure of battery cell 305, where electrode tab 307 couples with conductive tab 315 and where conductive tab 315 couples with module 310 may provide additional locations for potential corrosion. Accordingly, battery system 300 may include a configuration and coupling design to reduce the possibility of water ingress or access to conductive or other corrodible materials.

Conductive tab 315 may be coupled to module 310 along the first surface 312 of module 310. Conductive tab 315 may be coupled with the first surface 312 at a first end 317 of conductive tab 315. The coupling may be by a weld, conductive adhesive, or other conductive coupling allowing or facilitating electrical transfer between conductive tab 315 and module 310. Conductive tab 315 may extend from first end 317 along a length to a second end 319. From first end 317, conductive tab 315 may extend relatively or substantially parallel to a plane of first surface 312 of module 310. Second end 319 may also extend relatively or substantially parallel to the plane of first surface 312, and may be fixedly coupled with electrode tab 315 along a distal region of conductive tab 315 with a distal portion of electrode tab 307, such as an end portion 308. Conductive tab 315 and electrode tab 307 may also be coupled via weld, adhesive, or any other coupling allowing electrical communication between the components.

Proximate a midpoint of conductive tab 315, conductive tab 315 may be characterized by a curvature or fold of the tab. The fold 320 may allow a distal region of conductive tab 315, such as second end 319, to extend back across the first surface 312 of module 310 substantially parallel to the first surface 312 and the first end 317 of conductive tab 315. By including a fold in conductive tab 315, a surface may be provided across the second end 319 of conductive tab 315 for coupling electrode tab 307. Electrode tab 307 may be a more robust component than conductive tab 315 in some embodiments. For example, electrode tab may be thicker than conductive tab 315, and may provide additional support and protection to battery module 310. Battery system 300 may be used in any number of devices, including mobile devices that may be dropped, bumped, or otherwise jostled, which may affect interior components. As devices shrink, spacing within a device may also reduce, which may place multiple components in close proximity within the device. These components, which may include circuit boards, circuit components, circuit couplings, and other materials, may include sharp corners, or other features that may damage other components in close proximity. Battery module 310 may be a relatively fragile component, or may include fragile components within the structure. The coupling of battery cell 305 and module 310 may be performed to provide additional protection of the module and included components.

For example, as illustrated, in some embodiments electrode tab 307 may extend about module 310 on one or more sides. Module 310 may be seated on electrode tab 307. Module 310 may be at least partially adhered to electrode tab 307 along second surface 314 of module 310. For example, seating tape 322 may be included along a surface of electrode tab 307, and module 310 may contact seating tape 322 along second surface 314. Seating tape 322 may include adhesive on one or two surfaces, to couple with electrode tab 307, and optionally couple with module 310 as well in some embodiments. Seating tape 322 may include an amount of cushion or thickness to afford compression or flexibility for movement and protection of module 310.

Electrode tab 307 may be characterized by an arcuate shape that extends up a side of module 310 and curves towards end portion 308, which may be coupled with conductive tab 315. Electrode tab 315 may extend from battery cell 305 substantially parallel to first surface 312 of module 310, before turning orthogonally up a height of module 310, and then extending back across module 310 and again substantially parallel to first surface 312, with second end 319 of conductive tab 315 positioned between the first surface 312 of module 310 and the end 308 of electrode tab 307. This extension of electrode tab 307 may provide protection about an otherwise exposed side 316 of module 310 opposite an internal sidewall 318, as well as above and below module 310 as it is positioned relative to the battery cell 305. By configuring conductive tab 315 and electrode tab 307 to end parallel to first surface 312 of module 310, an exterior profile of module 310 as coupled with battery cell 305 may be characterized by substantially rounded corners and continuous side surfaces of the device.

Module 310 may include a number of components for protection and control over operations of battery cell 305. For example, module 310 may include a circuit board 325, which may include one or more components 330 extending from a surface of circuit board 325. Circuit board 325 may include a first surface 326 proximate or adjacent first surface 312 of module 310, and a second surface 327 opposite the first surface 326. In some embodiments, components 330 may extend from second surface 327 of circuit board 325, and may extend away from first surface 312 of module 310. Module 310 may include materials to protect components 330 from device abuse and potential water ingress by including them within a cavity 335 included within module 310. Cavity 335 may be filled with a pottant 338 configured to encapsulate components 330. The pottant 338 may be injected or applied during manufacturing to conformally coat the components and provide protection both to drop events as well as to water ingress. By utilizing pottant 338, components 330 may be substantially or essentially contained to limit the possibility of water or other liquid contact to the components 330.

Module 310 may include a spacer 340 that extends from second surface 314 up to or towards first surface 312 of module 310. Spacer 340 may be or include a plastic or other insulative material that provides additional crush protection for module 310. Spacer 340 may at least partially define cavity 335 within module 310 within or into which the components 330 may extend. Spacer 340 may include an adhesive along a surface of the spacer 340 to couple with circuit board 325, or may include a snap coupling about one or more locating features of the circuit board as will be discussed further below. Spacer 340 may also be characterized by an increased thickness on opposite sides of the module 310 proximate external side 316 and internal side 318 of the module 310. The increased thickness may be included along regions of the spacer 340 extending from second surface 314 to first surface 312 of module 310. Spacer 340 may be included to provide protection both during assembly and during events such as device drops for components 330. Spacer 340 may be made from a number of materials including foams, plastics, rubbers, and other insulating materials. Spacer 340 may be rigid, although in some embodiments spacer 340 includes an amount of flexibility or compression to withstand and protect components 330 during drop or abuse events of devices in which battery system 300 may be included.

To protect each of the conductive components, battery system 300 may include one or more layers of additional environmental protection. Module 310 may include an environmental protective tape, such as a first water resistant tape 350 extending about module 310, and at least partially covering first surface 312, second surface 314, interior sidewall 318 and external sidewall 316. While in some embodiments the tape is water resistant, in other embodiments the tape may be configured to simply protect the components from any environmental contaminants including dust, lint, or other particulates. The first water resistant tape 350 may be or include a polymer backing with an applied adhesive. The polymer may be any number of polymers that provide electrical resistivity, structural resiliency, hydrophobicity, and flexibility. For example, in some embodiments a polyimide-backed tape may be used, which may afford a thin film tape that may be flexible to accommodate the topography of module 310, while limiting gaps or spacing about the module. First water resistant tape 350 may extend across first surface 312, and may at least partially cover conductive tabs 315. For example, tape 350 may extend across conductive tab 315 over first end 317 extending to or towards fold 320 in embodiments. Tape 350 may be extended to cover a landing on module 310 for conductive tab 315 as will be described further below. Although described as a tape, additional adhesives, encapsulants, and enclosures may be utilized to provide a similar protection to components of the module 310, and limit access locations for water ingress.

Battery system 300 may also include a second water resistant tape 355 extending about module 310. Second water resistant tape 355 may be any of the materials discussed above for first water resistant tape 350, and in some embodiments second water resistant tape 355 is the same material as first water resistant tape 350. In other embodiments second water resistant tape 355 may be a different material than first water resistant tape 350. For example, second water resistant tape 355 may be exposed within the device housing battery system 300, while first water resistant tape 350 may be covered on one or more sides. Accordingly, second water resistant tape may be a thicker or more resistant material in some embodiments.

Second water resistant tape 355 may extend across one, two, three, or all sides of module 310, and may at least partially contact first water resistant tape 350. Second water resistant tape 355 may extend over or across the distal portion of electrode tab 307, and may extend across end 308 of electrode tab 307, and/or second end 319 of conductive tab 315. Second water resistant tape 355 may extend beyond the ends of conductive tab 315 and electrode tab 307 and may extend at least partially across first surface 312 of module 310 and over first water resistant tape 350. Second water resistant tape 355 may also extend at least partially along or over interior side 318 of module 310, and may contact first water resistant tape 350. In some embodiments, second water resistant tape 355 may also extend at least partially along or over second surface 314 of module 310, and may contact first water resistant tape 350 over the second surface. Second water resistant tape 355 may also extend along electrode tab 307 along exterior side 316 of module 310. Tape 355 may continue along an underside of the electrode tab 307 and continue to or towards battery cell 305. In some embodiments, tape 355 may couple with battery cell 305, or may extend proximate cell 305. By including second water resistant tape over the surfaces of the module, a more complete seal may be formed across all corrodible components.

Battery system 300 may also include a terrace 360 extending laterally from the battery cell and supporting module 310. Terrace 360 may be a bracket or other support structure that supports electrode tab 307 as it extends from battery cell 305, and may be a plastic, or insulative material in embodiments. Terrace 360 may span the entire length of the battery cell 305 to fully support module 310. Thus, along portions external from the electrode tab 307 or tabs, which may only extend partially along a length of battery cell 305, terrace 360 may include seating tape 322 between the terrace 360 and battery module 310. Seating tape 322 may include an increased thickness as previously discussed to accommodate the varying thickness along terrace 360 due to the inclusion of electrode tabs 307 over partial sections of the terrace, while maintaining contact with module 310 along an entire length of the module. Second water resistant tape 355 may extend across terrace 360 and may at least partially cover an underside of the structure. Accordingly, while one end of second water resistant tape 355 extends across terrace 360, a subsequent end of second water resistant tape 355 may overlap the first end and extend across second surface 314 of module 310, contacting seating tape 322 along the second surface 314 of module 310.

Figure 4A:
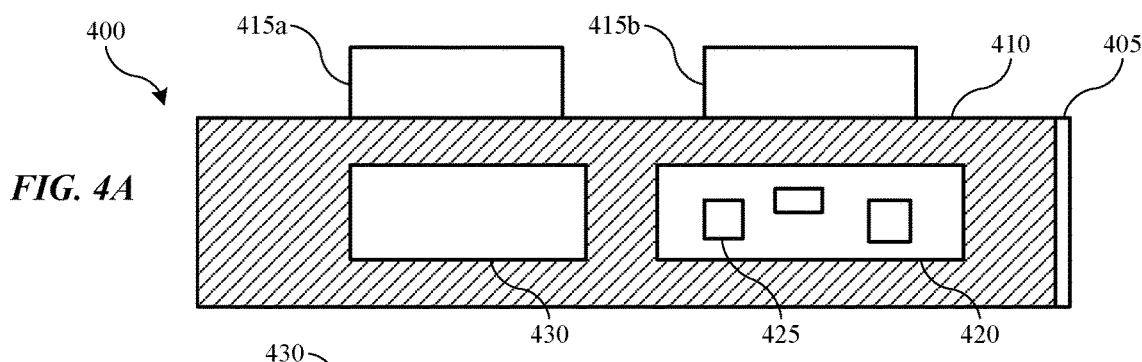
FIGS. 4A-4C show schematic views of a battery system module according to embodiments of the present technology.
Figure 4B:
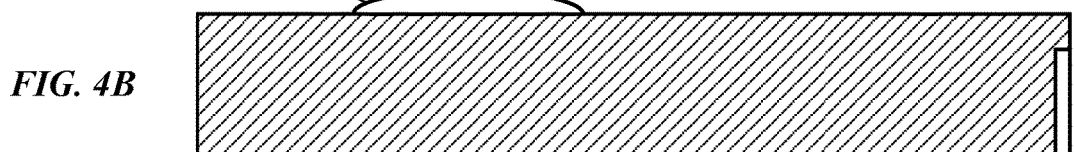
Figure 4C:
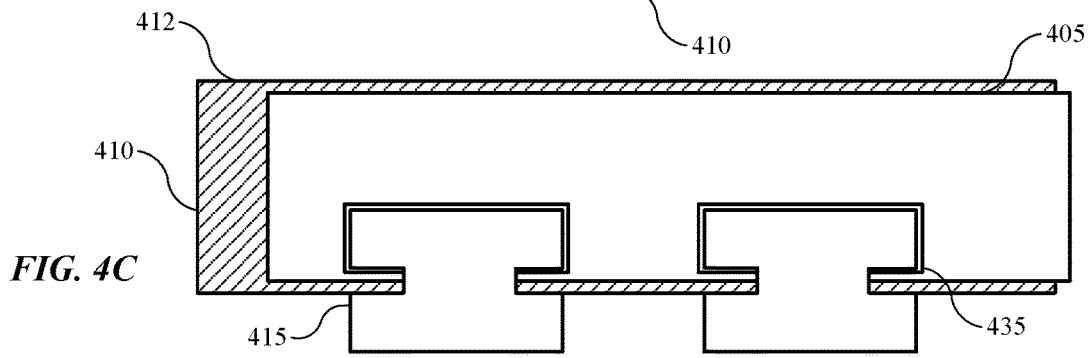

FIGS. 4A-4C show schematic views of a battery system module 400 according to embodiments of the present technology. Module 400 may include some or all of the characteristics described above for module 310. The figures may illustrate module 400 prior to application of first water resistant tape 350 as previously discussed to show additional components described. FIG. 4A illustrates a view along a surface of module 400, which may be similar to second surface 314 discussed above. Module 400 may include a circuit board 405 including a spacer 410 coupled with a surface of the circuit board. Module 400 may include one or more conductive tabs 415a, 415b, which may be used to couple with electrode tabs extending from a battery cell. Tabs 415 may be the same or different materials in embodiments, depending on the material used for electrode tabs from an associated battery cell. Spacer 410 may define one or more gaps across through the structure of the spacer, and in some embodiments may at least partially define a cavity 420 through spacer 410 as previously described. The cavity 420 may provide a region into which components 425 extending from a surface of circuit board 405 may extend. During manufacture, a pottant may be flowed or coated into cavity 420 to encapsulate components 425 as previously described.

An additional gap may provide access for an additional component extending from circuit board 405, as well as provide access for a locating feature to facilitate placement of the spacer 410 on circuit board 405. FIG. 4B illustrates an elevation view of module 400 including how spacer 410 may by placed over feature 430, which may extend beyond the boundaries of spacer 410. Feature 430 may facilitate placement of spacer 410 to protect components 425 during manufacturing operations. FIG. 4C illustrates an additional plan view along a surface opposite the surface shown in FIG. 4A. For example, FIG. 4C may illustrate a view along first surface 312 discussed above prior to application of first water resistant tape 350. As shown, spacer 410 may not surround circuit board 405 in embodiments. Spacer 410 may be adhered to a surface of the circuit board from which components 425 extend. Spacer 410 may extend laterally beyond circuit board 405 at a distal portion 412 of spacer 410. This may provide additional support for module 400 on an end opposite an end that may be coupled with additional circuitry or components from the circuit board 405.

Circuit board 405 may include one or more landing surfaces 435 to which conductive tabs 415 may be coupled, such as welded or adhered. Landing surfaces 435 may be sized slightly larger than outer dimensions of conductive tab 415 to ensure complete coupling of the conductive tab. As discussed previously, when a tape is applied, such as first water resistant tape 350, the tape may extend across the surface of the module past landing surfaces 435, and may extend to a joint or fold position of conductive tab 415. Conductive tabs 415 may include a variety of geometries providing a surface for coupling with electrode tabs of a battery cell. Although conductive tabs 415 may be rectangular, in some embodiments conductive tabs 415 may be characterized by a butterfly shape as illustrated to facilitate folding back across the surface of the module after a water resistant tape has been applied.

The features discussed previously may provide additional advantages in battery systems including multiple battery cells that may be included in a device. The space available for a battery within a device may determine the amount of power available, and the available run time prior to subsequent charging. Accordingly, providing additional space within a device for larger battery cells may be an enhancing feature of the device. Many conventional batteries are rectangular in shape, however, and thus extra space within a device housing having a perfectly rectangular shape may be limited. When multiple batteries are included within a housing, often those two batteries must be coupled together to provide sufficient function. Although series coupling may provide excess power, such a coupling configuration may limit control over the individual batteries. Parallel coupling may afford additional capability and monitoring, although individual control systems may be needed for each individual battery.

Figure 5:
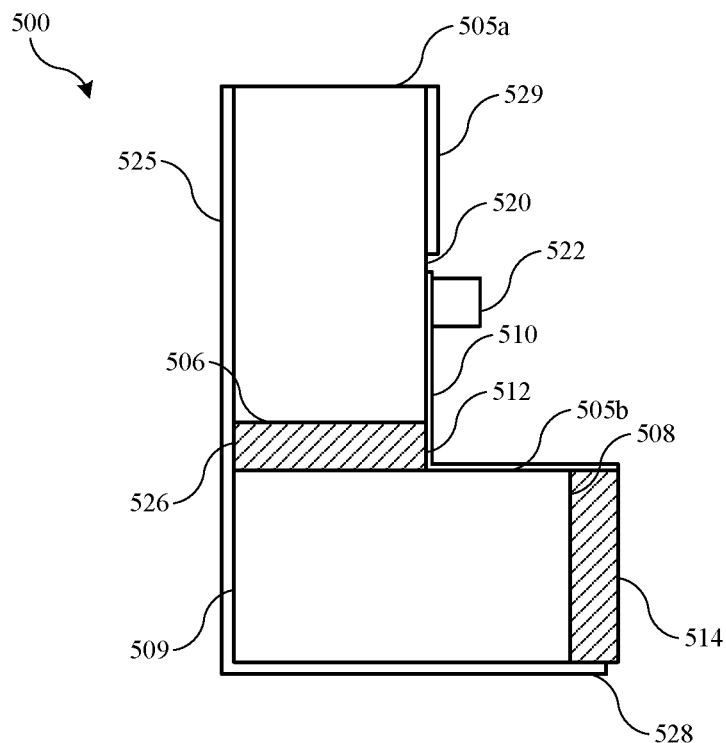
FIG. 5 shows a schematic plan view of a battery system according to embodiments of the present technology.

The packaging designs previously described may also afford additional benefits in multi-battery cell designs where each battery or cell includes an associated control module. FIG. 5 illustrates a schematic plan view of one exemplary multiple battery system 500 according to embodiments of the present technology. The figure shows one possible configuration of two battery cells 505 in a configuration having an overall non-rectangular profile, although it is to be understood that many variations based on this discussion are similarly encompassed by the present technology. Battery system 500 illustrates an L-shaped two battery configuration including a power module 510 for controlling, monitoring, and coupling the two battery cells.

Battery system 500 may include a first battery cell 505a having first electrode tabs extending from a first end 506 of the battery cell 505a, and electrically coupled with a first circuit module 512. Battery system 500 may also include a second battery cell 505b positioned adjacent the first end 506 of first battery cell 505a. Battery cell 505b may extend perpendicular to battery cell 505a. Additionally, battery cell 505b may include second electrode tabs extending from a first end 508 of battery cell 505b, and electrically coupled with a second circuit module 514. The coupling of battery cells 505a, 505b with first circuit module 512 and second circuit module 514, respectively, may be similar to the configurations previously described, such as with FIG. 3, for example. First circuit module 512 may extend parallel to the first end 506 of the first battery cell 505a. Similarly, second circuit module 514 may extend parallel to the first end 508 of the second battery cell 505b. As illustrated, a second end 509 of second battery 505b is positioned flush with an edge of first battery 505a, to form an L-shaped battery system. However, it is to be understood that configurations re-positioning second battery 505b, such as a T-shape, are similarly encompassed.

The first circuit module 512 and the second circuit module 514 may be coupled with one another through a power module 510, which may provide parallel access to the two circuit modules. By coupling the two control modules or circuit modules together both electrically and communicatively, an overall system control can monitor the cells individually and as a system to provide monitoring of both cells individually, as well as to provide cell balancing capabilities, and a single power tab 522 for battery power from the two batteries at a single location. Battery system 500 may also include a tray 525, which may be a bracket in which the system components are contained. Tray 525 may provide a structure in which the first battery cell 505a and the second battery cell 505b are seated. Tray 525 may also include a first section 526 extending along a portion of the first electrode tab included in module 512, and a second section 528 extending along a portion of the second electrode tab included within module 514. Bracket 525 may also include a sidewall 529 extending up a side of the battery system 500. Sidewall 529 may extend about battery system 500 along sides of the battery cells, and may extend substantially about the sides of the battery system 500.

Figure 6:
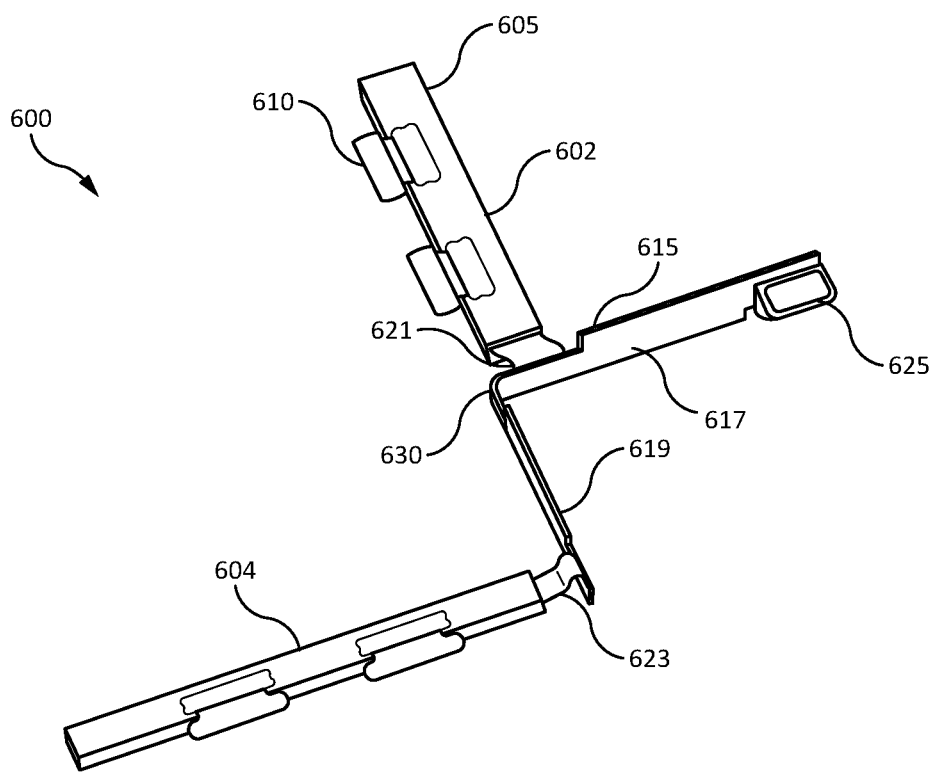
FIG. 6 shows a schematic perspective view of a battery system control module according to embodiments of the present technology.

FIG. 6 shows a schematic perspective view of a battery power module 600 according to embodiments of the present technology. Battery power module 600 may include components as described with any of the previous figures, and may illustrate a module prior to attachment with two battery cells in a configuration such as illustrated in FIG. 5. Some conventional technologies incorporate water ingress protection by rolling a control module in water resistant materials. However, when two or more battery control modules are incorporated on a power module, two different directions of roll would be needed, which cannot be performed when the modules are coupled together with a control module. Accordingly, the present technology allows formation of the individual circuit modules as previously discussed, and then power module 600 can be dropped in z-direction onto battery system 500 over electrode tabs prior to the final bend of the electrode tab end as shown in FIG. 3. FIG. 6 illustrates a power module 600 after a first water resistant tape 605 has been applied about the module, and over a first end of conductive tabs 610. Tabs 610 can subsequently be folded back across the surface of the circuit modules, and then power module 600 can be placed with the associated battery cells. The electrode tabs can be finally bent over the top of the modules and coupled with conductive tabs 610. A second water resistant tape can be applied over the module as previously described to produce the final cell structure with each module.

Power module 600 illustrates exemplary coupling of multiple battery cell control modules or circuit modules 602, 604 for use in a battery system such as illustrated in FIG. 5. Power module 600 may include a flexible circuit material 615, which may connect the individual circuit modules. Flexible circuit material 615 may be printed circuit board or other circuit materials that may allow electrical transmission as well as communication transmission to and from the individual circuit modules. Flexible circuit material 615 may include a first portion 617 that may extend along a first battery cell, such as battery cell 505a. Flexible circuit material 615 may also include a second portion 619 that may extend along a second battery cell, such as battery cell 505b. As illustrated, first portion 617 may extend in a first direction, and second portion 619 may extend in a second direction substantially normal to the first direction. The individual circuit modules 602, 604 may branch from the individual sections of the flexible circuit material 615. As illustrated, for example, in some embodiments first circuit module 602 extends normal to the first portion 617 of the power module 600. A flexible coupling 621 may electrically and communicatively couple circuit module 602 with power module 600. Additionally, in some embodiments, second circuit module 604 extends normal to the second portion 619 of power module 600. A flexible coupling 623 may electrically and communicatively couple circuit module 604 with power module 600.

Power module 600 may include a power tab 625 extending from the power module to provide electrical and communicative coupling for a control board or system board for the device in which the battery system utilizing power module 600 may be employed. Although illustrated as extending from first portion 617 of power module 600, power tab 625 may extend from second portion 619 in other embodiments. Additionally, power tab 625 may extend from either side of power module 600, although in some embodiments as illustrated power tab 625 extends from a first side of power module 600 opposite a second side of power module 600 from which the first circuit module 602 and the second circuit module 604 extend. In embodiments power tab 625 may be flexibly coupled with power module 600 to provide flexibility with attachments in production. Power module 600 may include a variety of components to provide an L-shaped control module for use with an L-shaped battery system. For example, the flexible circuit material 615 may include a first rigid section as the first portion 617 of power module 600, and a second rigid section as the second portion 619 of the power module. This may allow flush positioning adjacent the battery cells, and may allow the power module to seat within a tray, such as tray 525 discussed above. The rigid sections of the power module may sit between the tray sidewall and the batteries within the tray in some embodiments. The two rigid sections may be coupled by a flexible joint 630, which may facilitate positioning and manufacturing tolerances of battery systems. By utilizing designs of the present technology, improved contaminant protection and water ingress prevention capabilities may be provided in a variety of battery designs and configurations including single and multiple battery cell systems.

In the preceding description, for the purposes of explanation, numerous details have been set forth in order to provide an understanding of various embodiments of the present technology. It will be apparent to one skilled in the art, however, that certain embodiments may be practiced without some of these details, or with additional details.

Having disclosed several embodiments, it will be recognized by those of skill in the art that various modifications, alternative constructions, and equivalents may be used without departing from the spirit of the embodiments. Additionally, a number of well-known processes and elements have not been described in order to avoid unnecessarily obscuring the present technology. Accordingly, the above description should not be taken as limiting the scope of the technology.

Where a range of values is provided, it is understood that each intervening value, to the smallest fraction of the unit of the lower limit, unless the context clearly dictates otherwise, between the upper and lower limits of that range is also specifically disclosed. Any narrower range between any stated values or unstated intervening values in a stated range and any other stated or intervening value in that stated range is encompassed. The upper and lower limits of those smaller ranges may independently be included or excluded in the range, and each range where either, neither, or both limits are included in the smaller ranges is also encompassed within the technology, subject to any specifically excluded limit in the stated range. Where the stated range includes one or both of the limits, ranges excluding either or both of those included limits are also included. Where multiple values are provided in a list, any range encompassing or based on any of those values is similarly specifically disclosed.

As used herein and in the appended claims, the singular forms "a", "an", and "the" include plural references unless the context clearly dictates otherwise. Thus, for example, reference to "a material" includes a plurality of such materials, and reference to "the cell" includes reference to one or more cells and equivalents thereof known to those skilled in the art, and so forth.

Also, the words "comprise(s)", "comprising", "contain(s)", "containing", "include(s)", and "including", when used in this specification and in the following claims, are intended to specify the presence of stated features, integers, components, or operations, but they do not preclude the presence or addition of one or more other features, integers, components, operations, acts, or groups.

What is claimed is:

1. A battery system comprising:
   a battery cell, wherein the battery cell comprises an electrode tab extending from an edge of the battery cell; and
   a module electrically coupled with the battery cell, wherein:
   the module is characterized by a first surface, a height, and a second surface opposite the first surface,
   a conductive tab coupled along the first surface of the module extends from a first end parallel to a plane of the first surface,
   the conductive tab is characterized by a curvature at a midpoint of the conductive tab,
   a distal region of the conductive tab returns back across the first surface of the module parallel to the first surface, and
   a distal portion of the electrode tab is fixedly coupled with the distal region of the conductive tab; and
   a first water resistant tape extending about the module and across the first end of the conductive tab.

2. The battery system of claim 1, wherein the module comprises a circuit board including components extending from a surface of the circuit board.

3. The battery system of claim 2, wherein the module further comprises a spacer extending from the second surface of the module to the first surface of the module, and wherein the spacer defines a cavity into which the components extending from the surface of the circuit board are positioned.

4. The battery system of claim 3, wherein the spacer includes an adhesive coupling the spacer with the circuit board.

5. The battery system of claim 3, wherein the spacer is characterized by an increased thickness on opposite sides of the spacer extending from the second surface to the first surface.

6. The battery system of claim 3, wherein the module further comprises a pottant within the cavity and encapsulating the components extending from the surface of the circuit board.

7. The battery system of claim 1, further comprising a second water resistant tape extending across the distal portion of the electrode tab and contacting the first water resistant tape at the first surface of the module.

8. The battery system of claim 7, wherein the second water resistant tape extends about an interior side of the module and along the second surface of the module.

9. A battery system comprising:
   a battery cell, wherein the battery cell comprises an electrode tab extending from an edge of the battery cell;
   a module electrically coupled with the battery cell, the module comprising a circuit board including components extending from a surface of the circuit board, wherein:
   the module is characterized by a first surface, a height, and a second surface opposite the first surface,
   a conductive tab coupled along the first surface of the module extends from a first end parallel to a plane of the first surface,
   the conductive tab is characterized by a curvature at a midpoint of the conductive tab,
   a distal region of the conductive tab returns back across the first surface of the module parallel to the first surface, and
   a distal portion of the electrode tab is fixedly coupled with the distal region of the conductive tab; and
   a spacer extending from the second surface of the module to the first surface of the module, and wherein the spacer defines a cavity into which the components extending from the surface of the circuit board are positioned; and
   a pottant within the cavity and encapsulating the components extending from the surface of the circuit board.

10. The battery system of claim 9, wherein the spacer includes an adhesive coupling the spacer with the circuit board.

11. The battery system of claim 9, wherein the spacer is characterized by an increased thickness on opposite sides of the spacer extending from the second surface to the first surface.

12. The battery system of claim 9, further comprising a first water resistant tape extending about the module and across the first end of the conductive tab.

13. The battery system of claim 12, further comprising a second water resistant tape extending across the distal portion of the electrode tab and contacting the first water resistant tape at the first surface of the module.

14. The battery system of claim 13, wherein the second water resistant tape extends about an interior side of the module and along the second surface of the module.

15. A battery system comprising:
a battery cell, wherein the battery cell comprises an electrode tab extending from an edge of the battery cell; and
a module electrically coupled with the battery cell, wherein:
the module is characterized by a first surface, a height, and a second surface opposite the first surface,
a conductive tab coupled along the first surface of the module extends from a first end parallel to a plane of the first surface,
the conductive tab is characterized by a curvature at a midpoint of the conductive tab,
a distal region of the conductive tab returns back across the first surface of the module parallel to the first surface, and
a distal portion of the electrode tab is fixedly coupled with the distal region of the conductive tab; and
a first water resistant tape extending about the module and across the first end of the conductive tab; and
a second water resistant tape extending across the distal portion of the electrode tab and contacting the first water resistant tape at the first surface of the module.

16. The battery system of claim 15, wherein the module comprises a circuit board including components extending from a surface of the circuit board.

17. The battery system of claim 16, wherein the module further comprises a spacer extending from the second surface of the module to the first surface of the module, and wherein the spacer defines a cavity into which the components extending from the surface of the circuit board are positioned.

18. The battery system of claim 17, wherein the spacer includes an adhesive coupling the spacer with the circuit board.

19. The battery system of claim 17, wherein the spacer is characterized by an increased thickness on opposite sides of the spacer extending from the second surface to the first surface.

20. The battery system of claim 17, wherein the module further comprises a pottant within the cavity and encapsulating the components extending from the surface of the circuit board.

21. The battery system of claim 15, wherein the second water resistant tape extends about an interior side of the module and along the second surface of the module.

* * * * *